(12) United States Patent
Kaplan

(10) Patent No.: US 6,813,716 B1
(45) Date of Patent: Nov. 2, 2004

(54) SECURE CALLING CARD AND AUTHENTICATION PROCESS

(75) Inventor: Alan Edward Kaplan, Morris Township, Morris County, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/558,236

(22) Filed: Apr. 24, 2000

(51) Int. Cl.$^7$ ................................................ H04L 9/00
(52) U.S. Cl. ...................... 713/202; 713/172; 713/182; 713/183; 380/268
(58) Field of Search ................................ 713/202, 172, 713/182, 183; 380/268

(56) References Cited

U.S. PATENT DOCUMENTS

| | | | | |
|---|---|---|---|---|
| 5,251,259 A | | 10/1993 | Mosley | |
| 5,284,364 A | | 2/1994 | Jain | |
| 5,458,713 A | | 10/1995 | Ojster | |
| 5,613,012 A | * | 3/1997 | Hoffman et al. | 382/115 |
| 5,818,930 A | * | 10/1998 | Mark | 379/444 |
| 5,825,871 A | * | 10/1998 | Mark | 379/357.03 |
| 5,870,723 A | * | 2/1999 | Pare et al. | 705/39 |
| 6,011,847 A | * | 1/2000 | Follendore, III | 713/160 |
| 6,298,336 B1 | * | 10/2001 | Davis et al. | 705/41 |
| 6,325,284 B1 | * | 12/2001 | Walker et al. | 235/380 |
| 6,338,140 B1 | * | 1/2002 | Owens et al. | 713/168 |
| 6,466,671 B1 | * | 10/2002 | Maillard et al. | 380/227 |
| 6,615,264 B1 | * | 9/2003 | Stoltz et al. | 709/227 |

* cited by examiner

Primary Examiner—Gilberto Barrón
Assistant Examiner—Kambiz Zand
(74) Attorney, Agent, or Firm—Henry Brendzel

(57) ABSTRACT

Service is authorized through a process that employs a randomly sequenced table lookup that is based on predetermined information that was randomly assigned. In one embodiment, a calling card is issued with a table having a plurality of entries, with each entry comprising one or more digits. When wishing to make a call, the customer enters his/her ID. That ID is communicated to the service provider, based on that ID the provider retrieves from a database a table of the information that the customer has, and proceeds to request that the customer enter information pursuant to a random selection by the service provider.

3 Claims, 2 Drawing Sheets

| | | | | | |
|---|---|---|---|---|---|
| 1 | 357 | 11 | 756 | 21 | 408 |
| 2 | 129 | 12 | 398 | 22 | 129 |
| 3 | 434 | 13 | 543 | 23 | 633 |
| 4 | 754 | 14 | 754 | 24 | 132 |
| 5 | 837 | 15 | 925 | 25 | 866 |
| 6 | 537 | 16 | 739 | 26 | 109 |
| 7 | 986 | 17 | 602 | 27 | 773 |
| 8 | 603 | 18 | 597 | 28 | 460 |
| 9 | 295 | 19 | 261 | 29 | 908 |
| 10 | 278 | 20 | 955 | 30 | 353 |

SECURE CALLING CARD AND AUTHENTICATION PROCESS

BACKGROUND OF THE INVENTION

The present invention relates to telecommunications and more particularly to security techniques for calling cards.

The emergence of telephone company calling cards has caused significant changes in the way telephone company customers make phone calls while away from the home or office. The burdensome practice of rounding up large quantities of coins needed for long distance calls has been alleviated by the use of telephone calling cards.

The process of making calls using a calling card includes entering the called number, an account number (often the phone number of the card holder) and a personal identification number or "PIN" into a telephone keypad device. This enables a calling card customer to make one or more calls from that location. Charges for those calls are subsequently billed to the customer's calling card account.

Unfortunately, along with the conveniences and other advantages brought about by the advent of telephone calling cards, significant problems arose. Calling card account numbers along with valid PINs, (the combination of which is to be hereinafter referred to as "calling card access codes"), have become valuable commodities to persons in our society who engage in theft and fraud. It is well known that illegally obtained calling card access codes are sold to others. Typically, once calling card access codes are illegally obtained, they are rapidly communicated to a multitude of people who fraudulently use the stolen codes. Often, many calls are completed before the telephone company discovers the misuse and deactivates the stolen access codes. Consequently, the telecommunications industry has reported substantial revenue losses through fraudulent use of telephone access codes.

Account numbers by themselves are generally not regarded as confidential. They often comprise the area code and telephone number of the calling card account customer. However, the Personal Identification Number (usually comprised of 4 digits) is considered confidential. It is the combination of the account number and the PIN that is particularly vulnerable to misuse.

One form of misappropriation of the access codes is "out-of-network" theft. Sometimes, this is accomplished by stealing the physical card itself, or by simply examining a card that contains an account number and PIN directly on its face. Other times, a thief obtains the access codes by eavesdropping on a calling card customer (typically, with the aid of high powered surveillance equipment), or capturing the sequence of numbers as they are entered into the telephone keypad (e.g., looking at the keypad as the customer dial).

Another form of misappropriation of access codes is "in-network" theft. This can occur in two ways. The first is electronic eavesdropping by "hackers" of the telephone network. The second is unscrupulous telephone company insiders who have access to the codes.

One solution to "in-network" theft is to use cryptography techniques to encrypt calling card access codes prior to transporting them across the telephone network. The access codes are subsequently decrypted only within secure internal telephone company computer systems. Only the encrypted versions of the telephone access codes are transported over the telephone network, thereby preventing "in-network theft" by hackers.

Encryption/decryption techniques, however, present several problems. First, implementation of encryption/decryption techniques may require changes to many methods and procedures used by a telecommunications carrier. Second, the solution requires the maintenance, management and security of "encryption keys". Third, this solution only addresses "in-network" theft from the point of encryption on. If a customer always enters the same sequence of digits, the telephone company and the customers are still subject to capturing of the signal sequence transmitted by the customer, whether by hackers or by out-of-network spies.

SUMMARY OF THE INVENTION

The security problem of calling cards is substantially reduced by eliminating the practice of a customer providing the same information to the telephone company each time the calling card is used. This is accomplished via a randomly sequenced table lookup that is based on information that is randomly selected and associated with a given ID. Illustratively, a calling card is issued with a table having a plurality of entries, with each entry comprising one or more (telephone keypad) characters. The entries in the table are the randomly selected information. The party also receives an associated ID. When wishing to make a call, the customer enters his/her ID. That ID is communicated to the service provider, based on that ID the provider retrieves from a database a table of the information that the customer has, and proceeds to request that the customer enter information pursuant to a random selection by the service provider. A person who intends to fraudulently obtain service (henceforth, a "bogus customer") cannot take advantage of captured information because the next time an interaction with the customer takes place, the random selection would require the customer to input a different sequence of digits. Only the holder of the table of information and of the associated ID can, thus, receive service.

DETAILED DESCRIPTION

In accordance with the principles of this invention, a customer who wishes to have a calling card contacts a service provider and receives from the provider an ID and a collection of numbers. The principles of this invention do not require that a card itself is to be provided, although a physical card may be provided. As explained in more detail below, practitioners who provide such calling cards would be ill advised to place both the ID and the collection of numbers on the calling cards.

Figure 1:
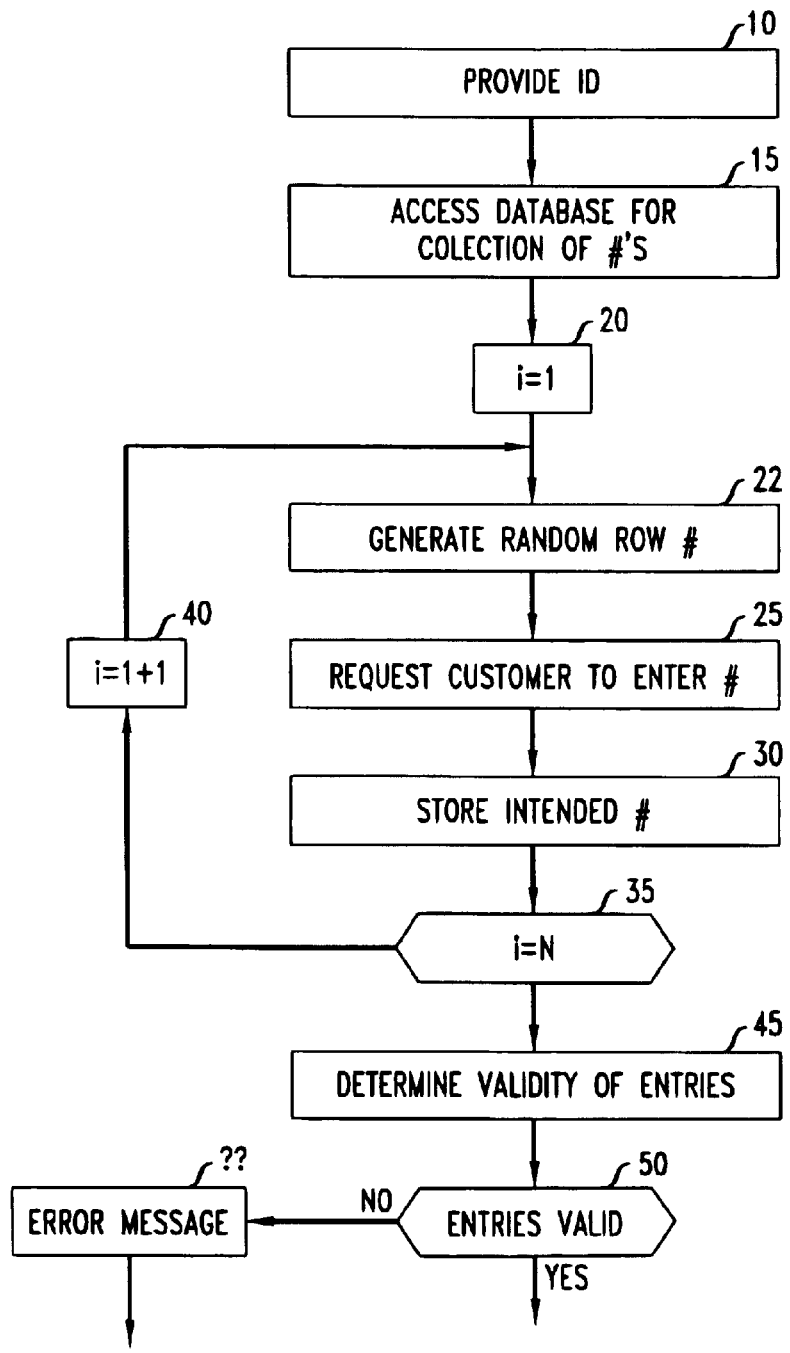
FIG. 1 presents a block diagram of the process by which a caller is authorized to receive service based on information provided in response to a se randomly sequenced table lookup.
Figures 2, 3:
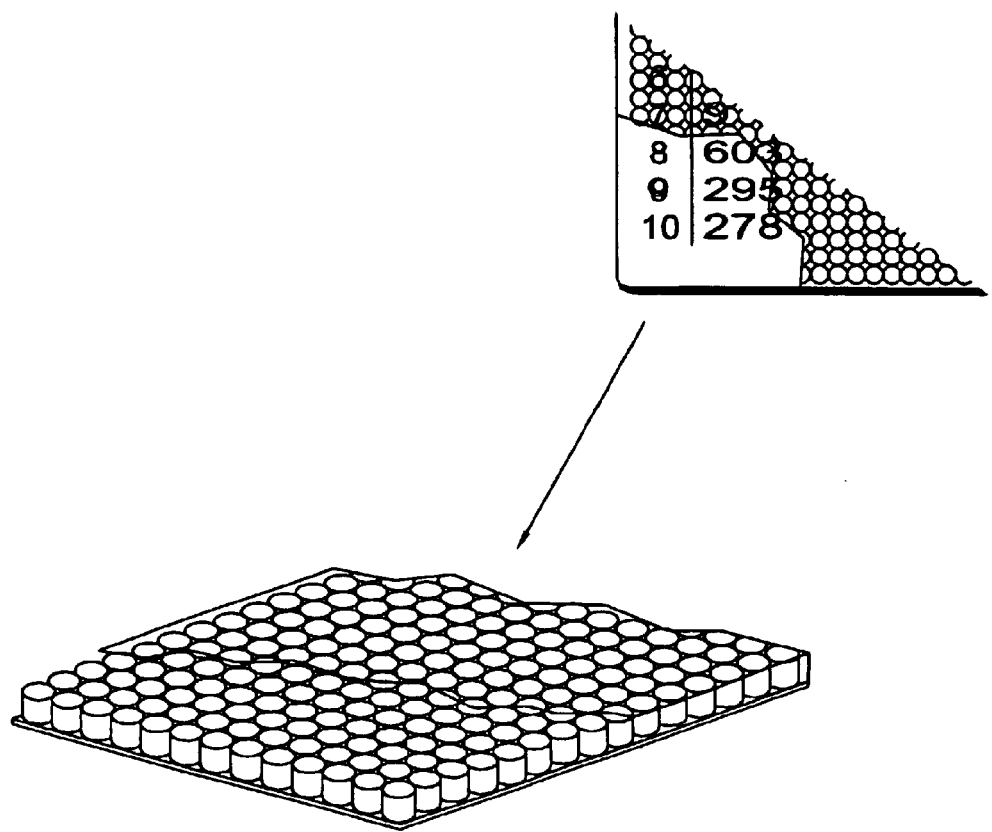
FIG. 2 illustrates a calling card that assists in effecting the process disclosed herein.
FIG. 3 presents an exploded view of a calling card embodiment with a light-collimating layer.

FIG. 1 presents a flow chart of the service authorization process of this invention. As depicted in FIG. 1, when the customer wishes to place a call, the customer provides the service provider with the customer's ID at step 10. At step 15, the service provider accesses a database and retrieves therefrom the collection of numbers that is associated with the ID. Illustratively, the collection of information is a table having, perhaps, 30 rows, with each row containing a three-digit number, as illustrated in FIG. 2. Once the service provider retrieves the table of information, control passes in the method of FIG. 1 to step 20, which sets an index, i, to 1 and passes control to step 22, which randomly generates a number in the range 1 to 30. Focusing on the row corresponding to the number selected in step 22, step 25 requests the customer to enter a number.

A customer who is the rightful owner of the ID has the same collection of numbers (i.e., the table of numbers) readily available. The assumption made by the service provider is that only the rightful owner of the ID has both pieces of information: the ID, and the table of numbers. Thus, in response to the request that is presented to the customer by step 25, the customer consults the table of numbers at his disposal and enters the appropriate number. When the customer's response is received, control passes to step 30, which stores the number entered by the customer and passes control to step 35. Step 35 determines whether the index i reached a predetermined level, for example, 4. If not, the index is incremented in step 40 and control returns to step 22. Otherwise, control passes to step 45. Step 45 accesses all of the responses provided by the customer and compares them to the information retrieved from the database. When the information provided by the customer corresponds to the information retrieved from the database, step 50 concludes that the rightful person is requesting service. Otherwise, an error signal is generated in step 55. The service provider responds to the error signal as it deems fit.

A number of considerations may be taken into account in deciding on the number of digits that each challenge calls for, on the number of requests that are set forth, and on the number of entries in the table of numbers. One consideration is the sequence of digits that the customer is asked to provide before service is granted. That affects the probability with which a bogus customer who spied the ID of a customer can enter the correct sequence. If each number in the table has 2 digits, and if there are 4 challenges, then the sequence entered by a customer has 8 digits. A bogus customer can enter the correct sequence with a probability of only $1/10^8$ (assuming the digits are in base 10). That is, on the average, the bogus customer would be successful once every 100 million tries. Another consideration is the number of different sequences that exist, and the probability that a sequence that has been captured by a bogus customer will be selected again. In the case of 4 numbers taken from a set of 30 numbers, there are 27,405 combinations $$\left(\frac{30!}{4!26!}\right),$$

and since each set of 4 numbers can be permuted, and there are 24 permutations (4!), there are 657,720 different sequences possible. If we allow numbers to appear more than once, then there are 810,000 possibilities. If the # and the * keys of a telephone key-pad are also permitted characters, then the number of possibilities is greater still. That means that a bogus customer who spies on a bona fide customer and captures both the ID and the sequence that the customer entered, has an extremely small change of being successful in using the ID again; and having used it successfully, the chances for a subsequent use are not increased. Many providers and customers would probably believe that the risk represented by the above illustrative example is acceptably low.

Of course, if the collection of numbers itself is stolen and if the thief also has the ID number, then the thief becomes the bona fide holder. For that reason, in an illustrative embodiment of this invention, as depicted in FIG. 2, when the collection of numbers is placed on a physical calling card, the ID is not placed on the calling card. In fact, it is advantageous to construct the calling card so as to discourage customers from writing down the ID on the calling card itself. To that end, the calling card might be constructed from a very hard and very smooth plastic that will not accept writing of any sort, or constructed from a very hard and very un-smooth material that will also make it difficult to write on.

As indicated above, at times the information that is entered by a customer is captured with the aid of high-powered surveillance equipment, such as binoculars, or a camera with a telephoto lens. To prevent such spying, people often try to place their bodies so as to shield what they are doing from the line of sight of others. In accordance with the principles of this invention, there is no need for shielding the keypad from the line of sight of others because, as indicated above, capturing a particular sequence represents little risk of compromising the calling card. On the other hand, if the calling card has a printed table, as illustratively depicted in FIG. 2, there is a chance that a camera can photograph the calling card itself, and capture the entire collection of numbers.

The numbers that are printed on the calling card can be made small, of course, but considering the vision problems of some bona fide customers, a provider of the calling cards might not wish to print the calling cards with a font that is very small.

It is recognized that the risk of someone capturing the entire collection of numbers that is printed on a calling card by means of a camera with an exceptionally powerful lens (e.g. effectively a telescope) is rather low. However, to lower this risk even further, FIG. 3 presents a calling card construction that includes a plastic layer on the face of the calling card that contains the collection of numbers. The plastic layer is constructed to collimate light, not unlike the way light is collimated from a traffic light. For example, the plastic layer can form a Fresnel lens, which would collimate the light and change to focus so that the card is placed closer to the customers' face. With the collimation layer, it will not be possible to see the numbers in the table, except from a very narrow range of angles.

Considering the fact that a calling card can be lost or stolen, and assuming that the ID is not compromised, it remains possible for the bogus customer to use the calling card, if the bogus customer can guess the correct ID. An ID that comprises a small number of digits is, of course, not advisable. In any event, the ID must have a range that is at least as great as the number of customers that the provider services. Happily, both considerations point in the same direction; to wit, employ an ID with a significant number of digits—perhaps 8.

It should be realized, of course, that the IDs do not have to be absolutely unique. They are only required to be unique for the calling cards that the service provider currently recognized, or services. More specifically, the ID may be unique for a person that is billed by the service provider. Hence, a person can have one ID but different cards with different collections of numbers, or a number of IDs. The key is that the ID identifies the party that is responsible for the charges that are accumulated. An ID that has been used previously but is currently expired can be reused, but it should carry a different collection of numbers. It is noted that by using different collections of numbers for two cards carrying the same ID (and hence having one person responsible for the charges) allows the provision of different levels of service for the two calling cards. Thus, a teenager, for example, could have a calling card that allows restricted calling, while the parent can have a calling card with the same ID, but a different collection of numbers and a different level of service.

In applications where a given ID carries a single collection of numbers, it is possible to algorithmically associate the collection of numbers to the ID. For example, the ID can be a hash of the collection of numbers.

It is impressed above that the ID and the table should not be imprinted on the card when the calling card in used, because theft of the card would represent an unacceptable risk. However, since the ID and the table are associated with one anther, there is some advantage to manufacturing cards with both pieces of information together. This would be particularly advantageous in connection with phone cards that have an initial pre-paid id i credit amount, where a card expires when credit amount is exhausted. Such cards are manufactured in large numbers. Care should be taken to select a manufacturing technique that strongly encourages customers to separate the ID from the table. For example, the calling card can be made of plastic, can have the table imprinted on the plastic, and can have an opaque paper label adhesively placed over the table. The ID might even be imprinted on the on the adhesive side of the opaque paper label, forcing the customer to remove the label from the calling card (or phone card) in order to use the card.

FIG. 1 shows that step 10, where the customer provides his or her ID number is taken first, followed by step 15. Actually, these steps can be taken at any time, as long as step 10 precedes step 15 and as long as both precede step 45. For example, steps 10 and 15 can follow step 35.

The above disclosed the principles of this invention by way of illustrative examples of various features, but it should be realized that various modifications and additions could be incorporated without departing from the spirit and scope of the invention. For example, the table include a column for a row numbers and a column for the random numbers of the card, the table can be broken up into sub-tables along the bigger dimension of the card, or the table can be constructed with a column for row numbers and a number of subsequent columns, each containing the random numbers of the card. The request for such a card would have the form "enter the number in row 8, column D." To give another example, the numbers on the table can be printed quite small, and a collapsible shroud can be added that contains a magnifying glass. This would allow both magnification and a narrowing of the field of view. Also, although it is not advisable to include the ID on the card that contains the table, some practitioners might find it desirable to, effectively, give a hint as a memory jog to the customer. The hint may be a number, or an alphanumeric. Of course, providers would likely put their name or logo on the card.

What is claimed is:

1. A method executed by a provider of authorizing provision of service to a user comprising:

a first step of interacting with said user to receive an ID from said user and with a database to receive an ordered list of characters associated with said ID that were selected by said provider;

a second step of interacting with said user to receive from said user information responsive to requests placed to said user in the course of said interacting, including the sub-steps of generating a predetermined number of random numbers;

for each random number so generated (a) requesting said user to provide a responsive string of characters that is related to said random number, (b) receiving said responsive string of characters from said user, and (c) flagging a number in said ordered list corresponding to said random number; and a third step of authorizing said provision of service when said information received in response to said request corresponds to a subset of entries in said ordered list of characters that is associated with said requests placed to said user, provided that said service is a permitted service for a user who provides said ID.

2. The method of claim 1 where said requests are communicated over a telephone, and said responsive string of characters is communicated over said telephone.

3. A method of authorizing provision of service to a user comprising the steps of:

receiving a ID from said user;

accessing a database to retrieve N ordered lists of characters associated with said ID, where N is an integer;

generating a predetermined number of random numbers;

for each random number created in said step of generating (a) requesting said user to provide a responsive set of characters that is related to said random number said requesting, which provides said random number, forming a challenge, (b) receiving said responsive set of characters from said user, and (c) flagging a number in each of said N ordered lists corresponding to said random number; and authorizing said provision of service when the set of responsive numbers received in response to said challenges matches a corresponding set of flagged numbers in any of said N ordered lists of numbers, provided that said service is a permitted service for a user who is associated with the ordered list that matches.

* * * * *